Jan. 1, 1946.      O. E. DEVER      2,391,952
ELECTRIC MOTOR DRIVEN LANDING WHEEL FOR AIRPLANES
Filed June 15, 1943
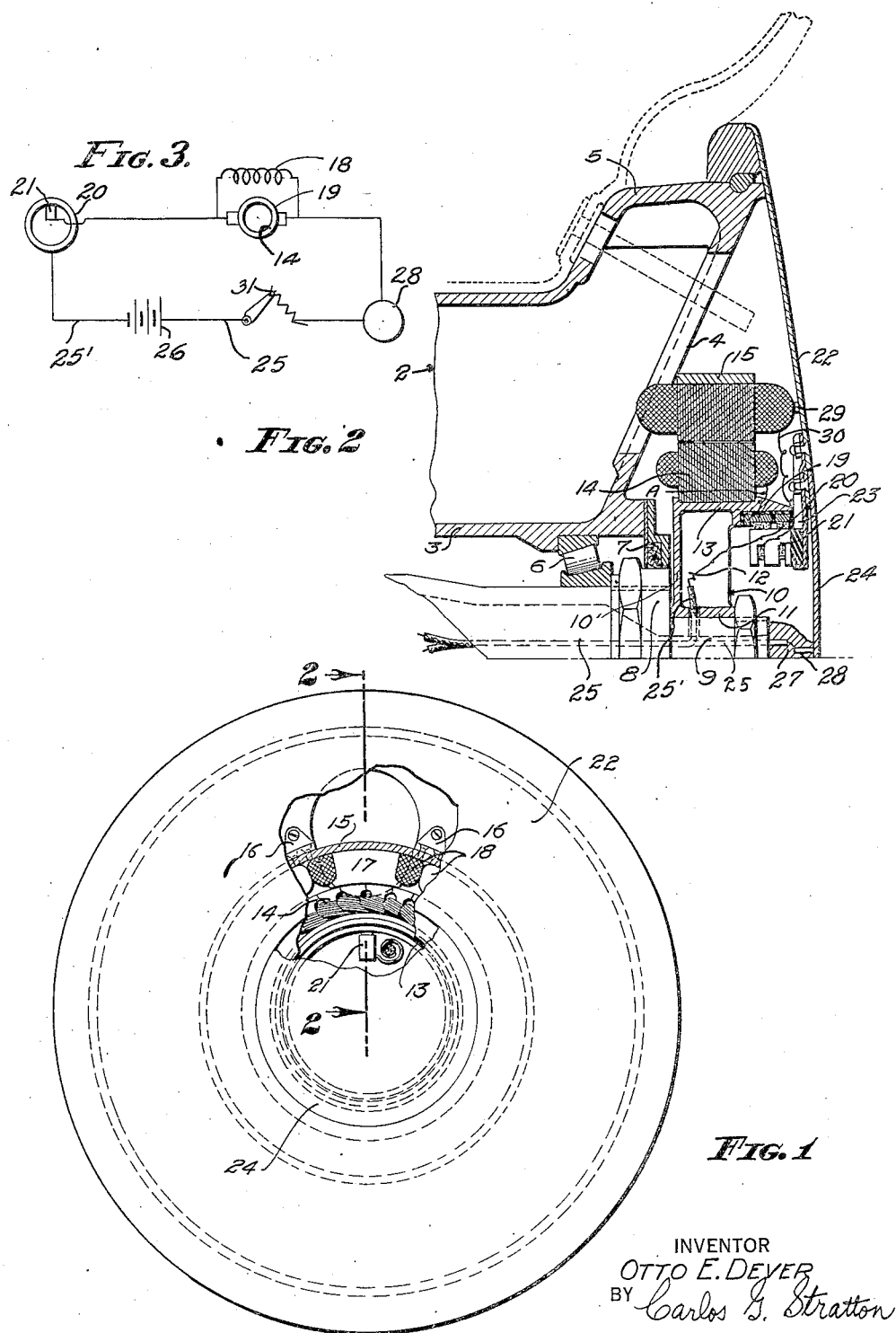
INVENTOR
OTTO E. DEVER
BY Carlos G. Stratton
ATTORNEY Patented Jan. 1, 1946

2,391,952

UNITED STATES PATENT OFFICE 2,391,952

ELECTRIC MOTOR DRIVEN LANDING WHEEL FOR AIRPLANES

Otto E. Dever, Burbank, Calif.

Application June 15, 1943, Serial No. 490,869

4 Claims. (Cl. 172—287)

My invention relates to electric motor driven landing wheels for airplanes, that is to airplane landing wheels which incorporate electric motors for the purpose of pre-rotating the landing wheels before the landing wheels touch the ground. Heretofore, the landing wheels of airplanes have not been pre-rotated. The wheels are at rest until contact is made with the ground, when suddenly they must be brought up to the ground speed of the airplane. This was not a serious problem when airplanes were light and had slow landing speeds; however, as the speed and weight of airplanes has increased, the problem incident to initial engagement of the landing wheels with the ground has reached serious proportions. This means that with high speed airplanes they must be given tremendous acceleration. Very skillful control by the pilot is required to keep the airplane from "nosing over." The wheels, of course, skid with each landing which not only causes severe tire wear, but materially increases the danger of a blowout, particularly when landing on emergency fields. As a consequence, the tires must be made much heavier than would otherwise be the case, and must be discarded long before they are actually worn out.

An object of my invention is to provide an electric motor driven landing wheel which enables the landing wheel to be brought up to speed before contact with the ground, thereby eliminating the difficulties pointed out above.

A further object is to provide an electric motor arrangement which may be incorporated in conventional landing wheel designs without material change in their construction or materially increasing their weight the end in view being to provide a simplified motor of few parts, of small compass, of economical manufacture, and one that may be readily attached to and detached from any wheel whether of an airplane landing gear or other vehicle to power the same by a self-contained power unit.

A still further object is to provide an electric motor driven landing wheel which not only serves to rotate the wheel prior to landing, but which during taxying after landing functions as regenerative brake by operating as an electric generator, thereby aiding and supplementing the operation of the main brakes.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts of the several views.

Fig. 1 is a side view of my electric motor driven landing wheel with the tire omitted, and with a portion of the cover plates removed to illustrate fragmentary arrangement of the electric motor therein.

Fig. 2 is an enlarged half-sectional view of the electric motor driven landing wheel taken through 2—2 of Fig. 1, the tire being indicated fragmentarily and by dotted line.

Fig. 3 is a diagrammatic view of the circuit.

Referring more in detail to the drawing, the airplane wheel is mounted on an axle 1. A wheel frame 2, in the form of a light weight casting is provided which comprises a hub 3, radiating spokes 4 and a felly or combined rim and felly 5. The hub is suitably supported on the axle by suitable bearings, only the outboard bearing 6 being shown, however. The outboard end of the hub 3 is provided with a suitable sealing ring 7 coacting with a sealing face 8 which may be part of a conventional retainer assembly which secures the wheel frame on the axle.

For purposes of my invention a short axle extension 9 continues from the axle 1. The axle extension 9 carries an armature supporting frame 10 comprising an inner flange 11 mounted on the axle extension, spokes 10' and an outer rim 13. Inasmuch as the designs of landing wheels differ, the exact method of mounting the armature varies. In some cases the conventional axle may be used, the armature support being incorporated with the retainer nut assembly of the wheel.

An armature 14 is mounted on the rim 13 of the frame 10. Radially outwardly of the armature and immediately outboard of the wheel spokes 4 is positioned a field coil ring 15 which is secured to the spokes 4 by brackets 16. Pole pieces 17 are secured to the radially inner side of the ring 15 and extend into proximity to the armature 14. Field coils 18 surround the pole pieces 17. The pole pieces are preferably located between the spokes 4 of the wheel frame 2 so that the field coils can extend into the spaces therebetween.

The rim 13 of the armature supporting frame 10 carries on its radially inner side a commutator 19 connected with the armature 14 by lead A and one or more slip rings 20 depending upon the design of electric motor employed and connected by lead 25' to one side of the battery 26, where that is the source of power. It should be understood that various motor designs may be adapted to my use. That is, the motor may be a direct current motor or an alternating current motor designed for sixty cycle frequency or the higher frequency of alternating current available in the electrical supply of airplanes. In either case the windings of the field coils and armature are conventional. An appropriate number of brushes 21 ride upon the slip ring and commutator. A cover plate 22 fits over the wheel frame 2 and electric motor and brackets 23 are secured thereto, which support the brushes 21. Preferably the cover plate 22 has a central opening large enough to expose the brushes and commutator, this opening being covered by an inspection plate 24.

It will be noted that the motor construction shown is relatively small as compared to the size of the airplane landing wheel, in fact small enough to fit between the wheel frame and the coverplate which streamlines the wheel. Thus, the overall dimensions of the landing wheel need not be changed. A small motor is sufficient for it is not necessary to accelerate the wheel rapidly as the wheel may be lowered into landing position an appreciable period before actual landing. Thus, a comparatively small motor can gradually bring the wheel up to landing speed for the wheel is carefully balanced and little effort is required to rotate it if rapid acceleration is not attempted. Furthermore, even though the wheel is accelerated slowly, the period of time that the motor is in operation is relatively short so that the amount of iron may be kept to a minimum even to the point where the motor would overheat if operated for a long period. This materially aids in reducing the size and weight of the motor. Also, weight may be reduced by the use of aluminum wire in place of copper wire. A further reduction in weight may be accomplished in those cases where the motor is installed on airplanes having a high frequency alternating current supply for, as it is well known, the amount of iron required in motors and transformers of given capacity is reduced as the alternating current frequency is increased.

While the motor may be conventional in respect to the type of motor used, that is whether direct or alternating current, the arrangement of the motor is distinguished by the fact that the armature remains fixed while the field coil revolves with the landing wheel, and the commutator is fixed while the brushes revolve. This materially simplifies the problem of bringing the current supply wires to the motor. The wires 25 are brought, as shown in Fig. 2, through the axle and one of the wires, to wit, the ground or return wire 25', being connected, as hereinbefore stated, to one side of the battery 26 and passing through the armature supporting frame. This wire leads to and is connected at its other end to one of the slip rings 20. The other wire 25, which includes a switch or rheostat 31, extends from the other side of the battery 26, through the axle 9 and into a body of insulation 27 which is secured to the extended portion of the axle and embeds therein a contact member 28. This member 28 is connected with the wire 25. That is the main line, and projects beyond the body of insulation and in contacting engagement with the cover plate 22, when said plate is set in position on a wheel. The cover plate 22 then becomes part of the circuit, which includes the field 15, through contact 29, with the cover plate 22, and the brushes 21 through the lead 30 from the field coils 15.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. An airplane landing wheel comprising in combination with an axle, a wheel structure freely rotatable thereon, an electric motor including an armature support secured to the outboard end of the axle, an armature carried by said support, a field magnet and coil assembly having means for detachably securing same to the outboard side of said wheel structure and adapted for coaction with said armature, a commutator carried by said armature support, brushes for said commutator and a cover plate secured to the wheel structure and extending over said motor and end of said axle and supporting said brushes.

2. An airplane landing wheel, comprising, in combination with an axle, a wheel structure freely rotatable on said axle, an armature support, an armature mounted on said support, a field magnet and coil assembly disposed to co-act with said armature to form a motor and having means for detachably securing same to said wheel structure, a cover plate for said wheel, motor and axle, and brushes carried by said cover plate.

3. An airplane landing wheel comprising, in combination with an axle, a wheel structure freely rotatable on said axle, a frame mounted on said axle, means to secure said frame detachably upon said axle, an armature carried by said frame, a commutator carried by said frame, a field magnet and coil assembly co-acting with said armature to form a motor, means for detachably securing said field assembly to said wheel structure, a cover plate for said wheel enclosing said motor and axle, a bracket on said plate, and brushes carried by said bracket.

4. An airplane landing wheel comprising in combination with an axle, a wheel structure freely rotatable thereon, a frame member stationarily mounted on said axle, an armature mounted and secured against rotation thereon, a commutator carried by said frame member, a field magnet and coil assembly disposed to co-act with said armature to form a motor, means for detachably connecting said field magnet and coil assembly to said wheel structure, means to lock said frame member against rotation on said axle, and a plate associated with said wheel structure and carrying brush elements to cooperate with said commutator.

OTTO E. DEVER.